Dec. 9, 1941.  E. V. BABBITT ET AL  2,265,593
PYROTECHNIC ARTICLE AND METHOD OF MAKING SAME
Filed Sept. 16, 1938  4 Sheets-Sheet 2

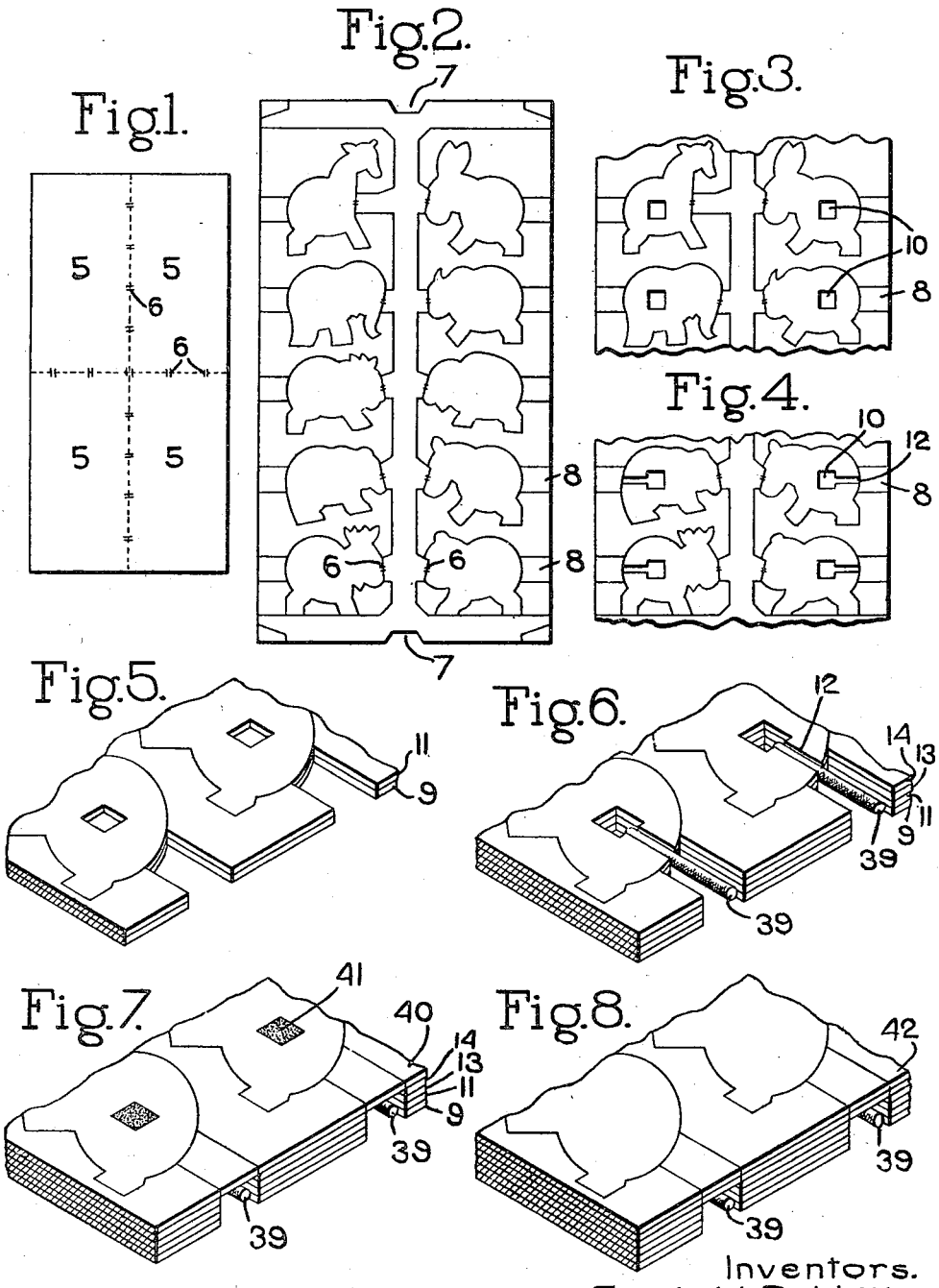

Inventors.
Edwin V. Babbitt
Lewis D. Coburn
by Heard Smith & Tennant.
Attys.

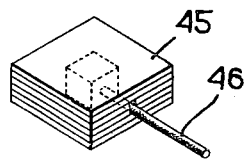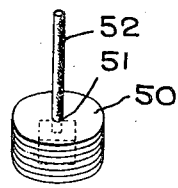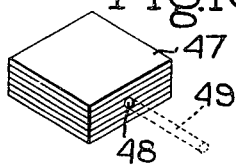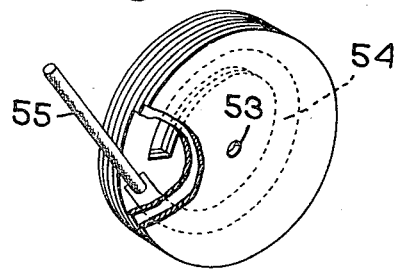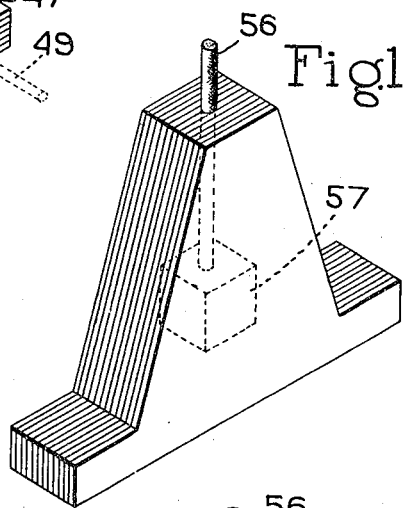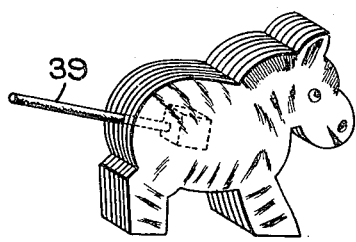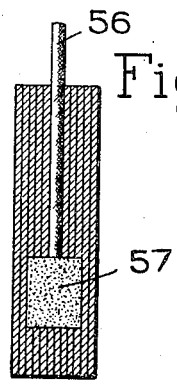

Dec. 9, 1941. E. V. BABBITT ET AL 2,265,593
PYROTECHNIC ARTICLE AND METHOD OF MAKING SAME
Filed Sept. 16, 1938 4 Sheets-Sheet 4

Inventors.
Edwin V. Babbitt
Lewis D. Coburn
by Heard Smith & Tennant.
Attys.

Patented Dec. 9, 1941

2,265,593

UNITED STATES PATENT OFFICE 2,265,593

PYROTECHNIC ARTICLE AND METHOD OF MAKING SAME

Edwin V. Babbitt, Marion, and Lewis D. Coburn, West Hanover, Mass.

Application September 16, 1938, Serial No. 230,290

32 Claims. (Cl. 102—20)

This invention involves a novel type of pyrotechnic article and method of making the same.

Pyrotechnic articles with which the present invention is concerned are of that type in which the article embodies a normally closed cavity containing pyrotechnic material in which the pyrotechnic material, when rendered active, explodes, burns, or acts to produce the desired pyrotechnic effect. Such articles may be of various shapes and sizes and produce a wide variety of pyrotechnic effects. Such articles are usually set into operation by the ignition of a fuse projecting through the wall of the article and into the cavity containing the pyrotechnic material. The ordinary firecracker is the simplest example of such a device.

The present invention has for its object to provide a pyrotechnic article made up of a plurality of laminae of sheet material, such as ordinary cardboard, adhesively secured together and with the cavity for containing the pyrotechnic material cut in the intermediate lamina or laminae.

The invention has for its further object to provide such an article in which a fuse is employed and in which the passage for the fuse in the preferred form of the invention is likewise cut in the intermediate lamina or laminae.

The object of the invention is further to enable the pyrotechnic articles to be produced rapidly, efficiently and at low cost.

One of the great advantages of the invention is that when the article is composed of several laminae of sheet material such as cardboard, for example, these laminae may be cut by cutting or punching dies readily made, easily operated and capable of cutting simultaneously a large number of figures in a single lamina or sheet of material. This enables not only the economies of mass production to be secured but also a wide range of shape or configuration of the articles to be available. This is largely because sheet material such as cardboard has long been commercially cut by dies, the outlines of the figures of which are formed by thin steel knives readily fitted to the required design.

The nature and objects of the invention will appear more fully from the accompanying description and drawings and will be particularly pointed out in the claims.

While the invention may be embodied in a wide range of pyrotechnic articles, some of which are illustrated herein, a firecracker has been selected as the first typical example for the purpose of disclosing a simple form of pyrotechnic article and a method of making it embodying the invention. The present invention enables the shape of a firecracker, instead of being restricted to the usual cylindrical or tubular shape, to be of endless variety, thus enabling pleasing, unusual and ornamental effects to be secured. As illustrating one such effect, the firecracker illustrated for a more detailed and specific disclosure of the invention is in the form of the figure of an animal with the fuse representing the tail of the animal. Furthermore, as such firecrackers are made in tremendous quantities requiring a number of die units to operate simultaneously in the cutting of the laminae, a variety of shapes of the articles may be produced simultaneously without additional expense.

In the drawings:

Fig. 1 illustrates on a small scale and in plan a single sheet of material, such as ordinary cardboard, which forms one of the laminae. These sheets may be of standard sizes.

Fig. 2 is a plan view of one section of a sheet of the material as cut by the die to form either a top or bottom lamina.

Fig. 3 is a view similar to a portion of Fig. 2 of a sheet of material as cut by the die to form a cavity-containing intermediate lamina.

Fig. 4 is a view similar to a portion of Fig. 2 of a sheet of material as cut by the die to form a cavity and fuse slot containing intermediate lamina.

Fig. 5 is a fragmentary view in perspective of an assembled bottom lamina and a superposed cavity-containing intermediate lamina.

Fig. 6 is a fragmentary view in perspective of the assembly with two cavity and fuse slot containing intermediate laminae superposed on the assembly shown in Fig. 5 and with the fuses in place.

Fig. 7 is a view similar to Fig. 6 with another cavity-containing intermediate lamina superposed on the assembly shown in Fig. 6 and with the explosive in place in the cavities.

Fig. 8 is a view similar to Fig. 7 with a top lamina superposed therein.

Fig. 13 is a perspective view of such a simple rectangular form of firecracker.

Fig. 14 is a perspective view of a cylindrical form of firecracker with the fuse projecting from the cavity through the top wall.

Fig. 15 is a view similar to Fig. 13 illustrating a fuse inserted through a hole drilled in the side wall of the firecracker.

Fig. 16 is a perspective view partially broken away illustrating the application of the invention to that form of pyrotechnic article known as a pin wheel.

Fig. 17 is a perspective view partially broken away illustrating the application of the invention to that form of pyrotechnic article known as a Vesuvius.

Fig. 18 is a perspective view of a single one of the firecrackers such as illustrated in Fig. 9 separated from the tree and ready for firing.

Fig. 19 is a view in vertical cross section of the article shown in Fig. 17.

Figure 9:
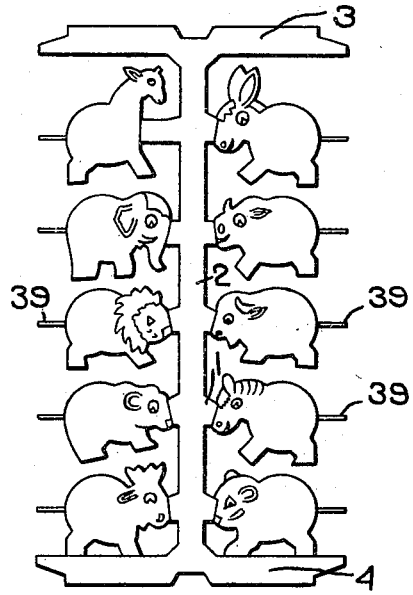
Fig. 9 is a plan view of a group of the firecrackers, such as illustrated in the previous figures, decorated and removably attached to a tree.

A preferred form of the invention will be understood from a description of the steps which may be employed in the manufacture of firecrackers having the shape of an animal, such as illustrated in Fig. 18, and preferably furnished for use in a group integral with but readily frangible from a tree such as shown in Fig. 9 and which constitutes a convenient package. The term "tree" is employed herein as a convenient designation of a temporary support to which the firecrackers or other pyrotechnic articles are attached in branching relation.

Each lamina is formed from a sheet of suitable material of which ordinary cardboard is an exemplification. Such a sheet is shown in Fig. 1 and may be of any suitable standard size. In carrying out the method, the entire sheets may be handled as entireties, or they may be handled in separate sections either throughout or at different stages of the method, according to the facilities available, the scale on which the manufacture takes place and the character of the articles to be formed, all of which, as will be readily understood, will determine the practice. In the example illustrated, it is assumed that the result ready for packaging or sale is to be a plurality of ten figures each in the form of some animal with these figures readily frangibly attached at their ends to a tree or an arrangement such as shown in Fig. 9. As there illustrated, each animal figure is attached to a projection such as 1 from the standard 2 of the tree, with the figures so arranged that the fuses project laterally at the sides of the group. The tree has a top bar 3 and a bottom bar 4 extending laterally coextensive with the lateral extent of the figures. Thus the entire group may be readily slipped into an envelope or otherwise wrapped as an entirety with the bars 3 and 4 protecting the figures so that they will not be disengaged from the tree. When ready for use, the individual articles are readily separated from the tree and may then be stood up on the ground or other support, as indicated in Fig. 18, and the article fired by lighting the fuse. It is assumed for convenience that the sheet 1 is of a size to present four sections 5, each of which will produce the group shown in Fig. 9. The cutting of the sheets may be performed by any suitable mechanism such as commonly employed for cutting the relatively thin sheets of cardboard, either a rotary die or a flat press die, and, as well known, these dies may be readily formed to cut any desired figure and will operate indefinitely to cut rapidly and efficiently such thin sheets of material.

In the particular construction illustrated, it will be seen that there are three sets of laminae, all of which have the same cuts but some of which have in addition cuts required to form the cavity in each figure and others of which have the cuts required to form these cavities and also the cuts required to form the fuse slots A convenient method of operation in cutting the lamina is, therefore, first, to fit the die to cut all the outlines required, including the cavities and the slots, and cut a required number of laminae; second, to remove the portion of the die for cutting the slots and then cut a required number of laminae; and, third, to remove the portion of the die for cutting the cavities and then cut a required number of laminae. There will thus be formed, (third), a number of laminae suitable for the top and bottom or end laminae of the articles, (first), a number of laminae suitable for the intermediate lamina having the cavities and fuse slots, and, (second), a number of intermediate laminae suitable for the intermediate laminae having the cavities alone. But where very large quantities are being made, three separate dies may, of course, be employed for forming these groups of laminae.

In the cutting operation, the outlines of the figures are preferably cut entirely through, excepting at the small uniting portions indicated by small parallel lines 6 and the lines dividing the sections 5 of the sheet are likewise cut through except at such uniting portions 6. While the cuts formed by the dies extend through the sheets of material, the entire sheet remains intact until broken apart and until such portions as are entirely cut around are pushed out from the sheets. Furthermore, the sheets and each section are preferably so designed as to leave at each edge a border or portion of the sheet beyond the outline of the figures, this border, in the case of the top and bottom of the sections, being formed by the top and bottom bars of the tree. It will thus be seen that the entire sheets, such as exemplified in Fig. 1, after being cut to form the various required laminae, may be handled and assembled in the manufacture of the articles although, with the method here illustrated for inserting the fuses, it is more convenient, after the assembly has reached the point for the insertion of the fuses, to break the sheets up into separate sections.

In assembling the laminae either in the form of complete sheets or in the form of sections of sheets, it is necessary to provide means for accurately gaging so that when assembled, the figures in the superposed laminae shall be in accurate registration. For this purpose suitable gage recesses such as 7 are cut by the dies.

In assembling, one or more of the sheets as cut for a bottom end lamina, such as shown in Fig. 2, are laid upon a suitable support having gages fitting the gaging recesses 7 and preferably with the portions 8 in alignment with the tail removed. One such lamina is shown at 9 in Fig. 5. If more are employed, a coating of suitable adhesive is applied to the upper lamina before it is placed on top of the lower. Then there is superposed on top of the lamina 9, also gaged by the gaging recesses, one or more of the intermediate cavity-containing laminae such as illustrated in Fig. 3 with the plugs 10 and the portions 8 removed. One of these laminae is shown in superposed position at 11 in Fig. 5 but there may be as many as desired and each will be coated with the adhesive so as to adhere to the underlying lamina. In a similar manner, one or more cavity and fuse slot containing laminae, such as illustrated in Fig. 4, with the plugs 10 for the cavities, 12 for the fuse slots, and the portions 8 removed, are superposed upon and adhesively secured to the underlying laminae as indicated in Fig. 6, where two such intermediate laminae 13 and 14 are illustrated. There will be as many of these last-named laminae as are required for the thickness of the fuse employed. At this stage the group of superposed laminae are now ready for the insertion of the fuses. Usually a number of these assemblies will be made, removed from the gaging table, superposed upon each other and placed in a press, but the completion of the assembly may proceed immediately if desired.

Figure 10:
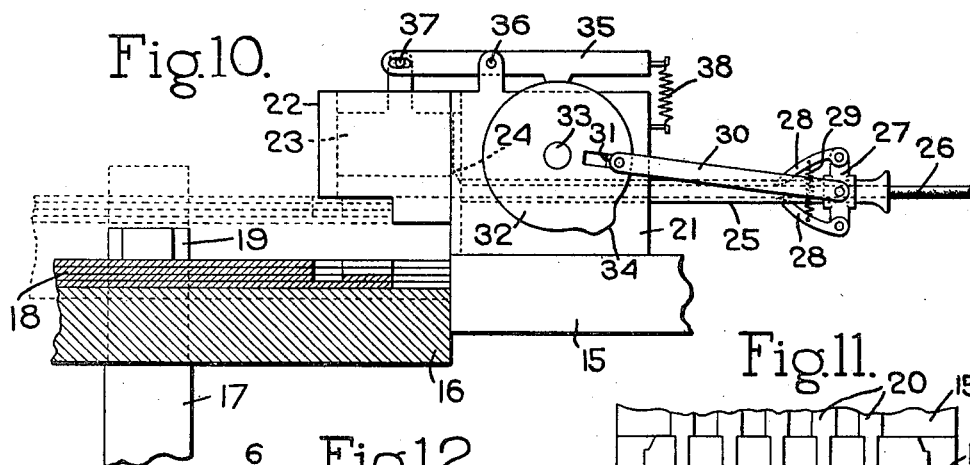
Fig. 10 is a view in elevation and partially in vertical cross section illustrating a mechanism for inserting the fuses in an assembly such as shown in Fig. 6.
Figure 11:
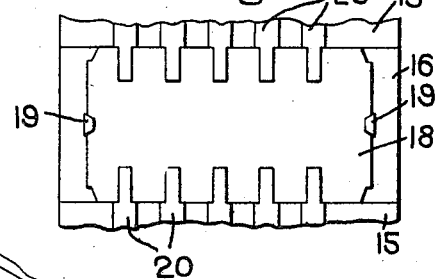
Fig. 11 is a diagrammatic plan view illustrating an arrangement of mechanisms for simultaneously inserting fuses.

The fuses may be placed in the assemblies, such as shown in Fig. 6, in any suitable manner, but to secure economy of manufacture, the fuses for an entire group are preferably inserted automatically and simultaneously. Any suitable means may be employed for that purpose and one suitable means for the purpose is illustrated in Figs. 10 and 11. A bed plate 15 is indicated provided with a central table section 16 carried by a suitable support 17 and mounted for vertical movement with respect to the bed plate. The table 16 is of the proper size to receive the assembly and is provided with suitable gages. An assembly such as fragmentarily shown in Fig. 6 is indicated generally at 18 resting on the table 16 with the gages 19 positioning the assembly by means of the gage recesses 7. On the bed plate 15 at each side are arranged a plurality of fuse-inserting mechanisms indicated generally at 20. Each of these mechanisms is adjustably secured to the bed plate in any desired position and thus each may be placed on the bed plate so as to present the fuse in line with the fuse slot of a particular figure in the assembly. These mechanisms insert the fuse by downward pressure into the slot and thus part of the mechanism overhangs the assembly. It is for this reason that the table 16 is given a vertical movement so that the assembly may be placed upon the table when in its lowered position shown in full lines in Fig. 10 and then the table raised to the fuse-inserting position shown in dotted lines.

One of the fuse-inserting mechanisms is shown more in detail in Fig. 10. It is illustrated as comprising a frame 21 adjustably mounted on the bed plate 15 and having an arm 22 overhanging the table 16. In the overhanging arm there is mounted for vertical movement a plunger 23 of a width just to fit within the fuse slot and having fixed thereto at its outer end a knife 24. The arm is so positioned and the proportions are such that when the plunger descends, the knife will cut off the required length of fuse and this fuse section will simultaneously be forced down into the fuse slot. A tube 25 is mounted in the frame 21 so as to extend preferably in line with the top of the assembly from a point adjacent the vertical path of the cutting edge of the knife 24 well outwardly from the frame. The fuse strip 26 extends from a suitable supply into this tube and is fed forward through the tube beneath the plunger and over the fuse slot in the assembly the required distance by a suitable feeding mechanism. The feeding mechanism illustrated comprises a traveler 27 mounted to slide longitudinally on the tube 25 and provided with a pair of oppositely disposed fingers or feed points 28 extending through longitudinal slots in the tube and drawn by the spring 29 into engagement with the fuse therein. The traveler 27 is connected by a link 30 to a block 31 radially adjustable on a crank disk 32. The crank disk 32 is mounted on a shaft 33 journalled in the frame and rotated by any suitable means. The crank disk 32 at its periphery is provided with a cam projection 34 which cooperates with a lever 35 fulcrumed at 36 to the frame and having a slot and pivot connection at its inner end at 37 to the plunger and held in engagement with the crank disk by a spring 38 connecting its opposite end to the frame.

The operation of the mechanism will now be apparent. When the assembly is in position and the fuse-inserting mechanism has been adjusted on the bed plate so as properly to position it with respect to the fuse slot, the shaft 33 is rotated feeding the fuse strip forward over the fuse slot and then depressing the plunger and knife which cuts off the required section of fuse and forces it into the fuse slot 12. Thus a fuse 39 is placed in each fuse slot and left projecting therefrom.

After the fuses are inserted in the assembly, one or more of the cavity-containing intermediate laminae are then preferably added to the assembly to increase the cavity to the size required for the explosive or other pyrotechnic material and thereafter the cavities are filled with the pyrotechnic material in any suitable manner, either manually or automatically. Such an assembly is fragmentarily illustrated in Fig. 7 with one such additional intermediate lamina shown in place at 40 and with the pyrotechnic material 41 filling the cavities. As in the case of the previous assemblies, these assemblies such as shown in Fig. 7 would usually be made up in considerable numbers and subjected to pressure to secure the additional laminae adhesively in place before being filled with pyrotechnic material.

In a similar manner, one or more of the top or end laminae are added, thus forming assemblies such as fragmentarily indicated in Fig. 8, wherein a single additional top or end lamina 42 is shown adhesively secured and pressed in place and thus covering the cavities.

The waste material surrounding the tree and the figures is subsequently removed from each assembly, leaving in this case the figures secured to the tree or a structure such as illustrated in Fig. 9. But it is understood that all or any portions of the waste material may be removed in any of the preceding operations where it is desirable. This waste material may be removed in any desired way, but usually it is desirable to superpose several assemblies and by a suitable press, or other instrumentalities, push out the waste material.

The figures, and the tree if desired and when used, may be painted, printed, or otherwise decorated or ornamented by any of the usual means, either after the figures have been completed or by treating the exposed surfaces of the end or top and bottom laminae before they are embodied in the assembly.

While in the foregoing description the fuses are described as inserted into fuse slots cut in the intermediate laminae, the assembly may be built up with all of the intermediate laminae of the type shown in Fig. 3, that is, without fuse slots, and after the filling of the cavities and the completion of the assembly, holes may be drilled or otherwise formed extending from the cavities to the exterior of the figures and the fuses pushed either by hand or by machine into these holes, being preferably moistened with adhesive prior to insertion.

One of the figures is shown separately detached from the tree and ready for firing in Fig. 18.

While the more elaborate form of the article and a preferred method of its construction has thus been described, it will be readily understood that the invention is adapted to a wide variety of pyrotechnic articles. Very simple forms are shown in Figs. 13, 14, and 15, representing small firecrackers. In the square form illustrated in Fig. 13, the assembly would be built up from sheet material divided into sections such as fragmentarily illustrated in Fig. 12, wherein a portion of one sheet of material 43 forming one lamina is shown divided into sections 44 by suitable cuts and each section divided into a number of square figures all held in place by the uncut portions 6. The endmost laminae would be similarly constructed without the cavities and some of the intermediate laminae would be provided with fuse slots or not, as required. One of the square firecrackers 45 thus formed is shown in Fig. 13 with the projecting fuse 46 placed in intermediate slotted laminae after the manner already described, while in Fig. 15, a similar square firecracker 47 is illustrated. In the latter case, no fuse slots are formed in the intermediate laminae but, after completion, a hole 48 is drilled therein to receive a fuse 49 indicated in dotted lines. In a similar manner, a cylindrical firecracker may be made by the use of intermediate laminae provided only with cavities and without fuse slots. Such a cylindrical firecracker 50 is shown in Fig. 14 wherein, after completion of the assembly, a slot or hole is punched at 51 in the end lamina or laminae and a fuse 52 forced therethrough into the cavity.

A further embodiment of the invention is illustrated in Fig. 16 as a pin wheel. In this case the figures cut in the sheet material are circular and provided with a central opening 53 serving as an axis of rotation and through which a pin or a nail may be inserted. In this case the cavity for containing the pyrotechnic material is arcuate and generally concentric with the axis of rotation, the intermediate laminae for this purpose being formed with the arcuate openings 54. A fuse 55 is by either of the methods already described positioned in one end of the arcuate cavity thus formed and extends out through the periphery of the article. The cavity is filled with a suitable pyrotechnic material so that when the fuse 55 is lighted and burns out, igniting the pyrotechnic material, the result will be to discharge the burning products through the opening left by the fuse and cause the device to rotate on its axis after the manner of a pin wheel.

Another illustrative embodiment of the invention is shown in Figs. 17 and 19 in the form of what is known as a Vesuvius and differs only in construction from the forms already described in the shape and thickness due to the use of a large number of intermediate laminae. This device is intended to be stood upright with the fuse 56 extending vertically so that when the fuse is lighted, suitable pyrotechnic material in the cavity 57 will discharge through the fuse opening, giving the effect of a volcano.

It has been pointed out that within the broader scope of the invention, the fuses may be placed in the assemblies in any suitable manner. With the means specifically illustrated and described for inserting the fuses, the relative position and arrangement of the fuse slots is immaterial. It will be noted, however, that the fuse slots are shown at each side of the several sections parallel and equispaced, which would simplify the positioning of the fuse-inserting mechanisms specifically illustrated and would also be of advantage with other means and methods of fuse insertion.

The invention may also be embodied in an article composed of only three laminae of sheet material adhesively secured together, in which the intermediate lamina is provided with a central opening forming with the end laminae the required closed cavity for containing the pyrotechnic material. The intermediate lamina may be made of the same thickness of sheet material as the end laminae. The article may, in fact, be composed of a plurality of at least three laminae of sheet material adhesively secured together in which one or more of the intermediate laminae are provided with the central opening forming with the end laminae the required closed cavity.

In all forms of the article embodying this invention it is preferable that an adhesive shall be employed of such a character and the zonal area of the surfaces of the laminae secured together and which surrounds the cavity shall be such and so related to the bursting force or power of the explosive in the cavity that the separation of the article shall not take place where the laminae are adhesively secured together but rather that the rupture shall occur transversely of the article.

Figure 20:
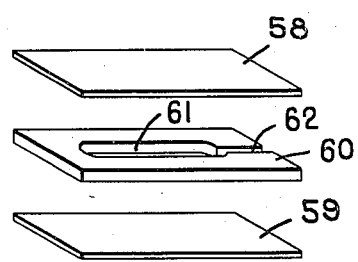
Fig. 20 is a view in perspective of three laminae ready for assembling into a thin, flat, rectangular firecracker.
Figure 21:
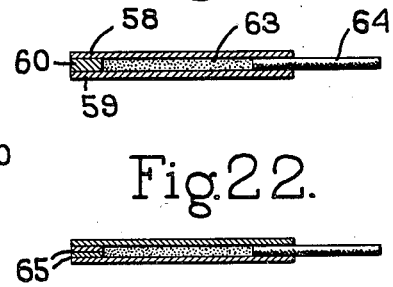
Fig. 21 is a view in longitudinal cross section of the completed firecracker formed from laminae such as shown in Fig. 20.
Figure 22:
Fig. 22 is a view similar to Fig. 21 with the firecracker formed with two intermediate laminae.

In Figs. 20 to 25 there are illustrated exemplifications of firecrackers embodying the broad features of the invention. In Figs. 20 to 22, inclusive, there is illustrated a narrow, thin, flat form of firecracker. In Fig. 20 there are shown three laminae of the same dimensions, two end laminae 58 and 59 and an intermediate lamina 60, all formed of cardboard or similar sheet material but with the intermediate lamina of greater thickness than the end laminae. This intermediate lamina is cut out with a long, narrow, central opening 61 and with a fuse slot 62 extending therefrom to the peripheral edge. By making the central opening 61 long, the cavity formed when the three laminae are adhesively secured together may be of sufficient size to hold the required amount of pyrotechnic or explosive material. A completed firecracker is shown in cross section in Fig. 21 made up of laminae such as shown in Fig. 20 with the explosive material 63 and the fuse 64 in place. In Fig. 22 there is shown in similar cross section a similar firecracker in which instead of a single relatively thick intermediate lamina there are shown two thin intermediate laminae 65 provided with registering central openings and slots similar to 61 and 62 thus forming a central cavity of suitable size for the explosive material and slot for the fuse.

Figure 12:
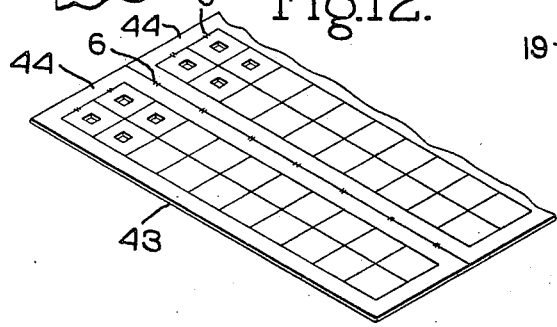
Fig. 12 is a view in perspective of a portion of a sheet of material or single lamina such as employed in the making of a simple rectangular form of firecracker.
Figure 23:
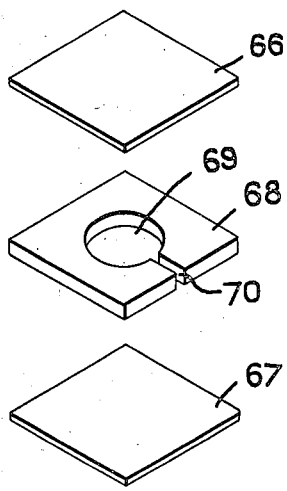
Fig. 23 is a view in perspective of three laminae ready for assembling into a simple square form of firecracker.
Figure 24:
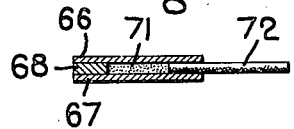
Fig. 24 is a view in cross section of a firecracker composed of laminae such as shown in Fig. 23.

In Figs. 23 and 24 a square form of firecracker of the type illustrated in Figs. 12 and 13 is shown made up of three laminae, two end laminae 66 and 67, and an intermediate lamina 68 of greater thickness with the central opening 69 and fuse slot 70 cut therein, the completed firecracker being shown in Fig. 24 in cross section with the explosive material 71 and fuse 72 in place.

Figure 25:
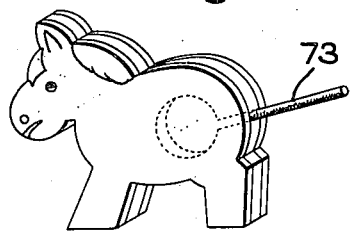
Fig. 25 is a view in perspective of a firecracker of the figure type formed of three laminae.

In Fig. 25 a still further embodiment of a simple form of firecracker of the animal or figure type previously described is illustrated made up of three laminae with the central lamina having the central opening for containing the explosive material and the fuse slot properly located to receive the fuse 73 and have it project at a position to represent the tail of the animal.

Each of these simpler forms of articles embodying the invention shown in Figs. 20 to 25, inclusive, are formed in multiple from sheets of material and assembled in the manner already described in connection with various articles previously illustrated and described and therefore no further description thereof is necessary.

It will be understood that the foregoing are but illustrative examples of the broader scope of the invention and that any such articles may be painted, printed or decorated and may be made of various sizes and shapes. Pyrotechnic or explosive material either in the form of powder or pellets, preferably of a character to be ignited by a fuse, may be put in position before the sections are united by any suitable method.

This application is a continuation in part of application Serial No. 187,206, filed January 27, 1938.

Having thus described the invention, what is claimed as new and desired to be secured by Letters Patent is:

1. A pyrotechnic article having a casing composed of a plurality of sheet material discrete end and intermediate laminae adhesively secured together, a plurality of the intermediate laminae having registering central openings together forming a cavity closed by the end laminae, pyrotechnic material in said cavity, and a fuse extending from said pyrotechnic material through a wall of the cavity and projecting from the exterior of the article.

2. A pyrotechnic article having a casing composed of a plurality of sheet material discrete end and intermediate laminae adhesively secured together, a plurality of the intermediate laminae having registering central openings together forming a cavity closed by the end laminae, pyrotechnic material in said cavity, and a fuse extending from said pyrotechnic material through a lateral wall of the cavity and projecting from the exterior periphery of the article.

3. A pyrotechnic article having a casing composed of a plurality of sheet material discrete end and intermediate laminae adhesively secured together, a plurality of the intermediate laminae having registering central openings together forming a cavity closed by the end laminae and in which at least one of the said intermediate laminae is provided with a slot extending from the central opening to the exterior edge, pyrotechnic material in said cavity and a fuse located in said slot extending from the pyrotechnic material and projecting from the exterior periphery of the article.

4. A pyrotechnic article having the construction defined in claim 2, in which the laminae are of the same size and same configuration at the exterior edge and have the configuration of a figure of an animal with the periphery of the laminae in registry, in which at least one of the intermediate laminae provided with the central opening presents a slot extending from the opening to the exterior edge at approximately the location for the tail of the animal and in which the fuse is located in said slot and projects from the exterior of the article in simulation of the animal's tail.

5. A pyrotechnic article having the construction defined in claim 1, in which the fuse extends through that wall of the cavity formed by an end lamina.

6. A firecracker consisting of a plurality of discrete end and intermediate cardboard laminae of similar configuration at the exterior edge adhesively secured together in registry, having a central cavity in the intermediate laminae closed by the end laminae, explosive material within the cavity, and a fuse extending from the cavity to and projecting from the exterior of the firecracker.

7. A firecracker consisting of a plurality of discrete end and intermediate cardboard laminae of similar configuration at the exterior edge adhesively secured together in registry, having a central cavity in the intermediate laminae closed by the end laminae, explosive material within the cavity, and a fuse extending laterally through the intermediate laminae from the cavity to and projecting from the edge of the firecracker.

8. A pyrotechnic article having a casing composed of a plurality of sheet material discrete end and intermediate laminae adhesively secured together and rotatable about a central axis normal to the laminae, a plurality of the intermediate laminae having registering central openings of arcuate shape together forming a cavity generally concentric the axis of rotation and closed by the end laminae, pyrotechnic material in said cavity and a fuse extending from said pyrotechnic material at one end of said cavity through a wall of the cavity and projecting from the exterior of the article.

9. A pyrotechnic article assembly comprising a plurality of discrete cardboard laminae adhesively secured together in which the laminae are of the same size and same configuration at the exterior edge and each lamina is an integral unit having the configuration of a tree and of a plurality of attached pyrotechnic articles, in which the laminated pyrotechnic articles thus formed are each readily frangible at one end from the laminated tree, in which each of the laminated pyrotechnic articles presents a closed cavity, pyrotechnic material in said cavities, and a fuse projecting from each cavity.

10. A pyrotechnic article assembly having the construction defined in claim 9, in which the fuses project from the ends of the laminated articles opposite the laminated tree and in which the said tree presents a laminated top bar and a laminated bottom bar laterally coextensive with the lateral extent of the articles.

11. A firecracker assembly comprising a plurality of discrete end and intermediate cardboard laminae adhesively secured together, in which the laminae are of the same size and same configuration at the exterior edge and each lamina is an integral unit having the configuration of a tree and of a plurality of attached animals, in which the laminated animals thus formed are each readily frangible at the head end from the laminated tree, in which each animal presents in the intermediate laminae a cavity closed by the end laminae, explosive material in said cavities and a fuse projecting from each cavity at the end of the animal opposite the tree in simulation of a tail.

12. A firecracker assembly having the construction defined in claim 11, in which the said laminated tree is provided with a laminated top bar and a laminated bottom bar laterally coextensive with the lateral extent of the animal figures.

13. The method of making pyrotechnic articles which comprises cutting through separately a plurality of similar intermediate sheets of material to form in each in place therein a plurality of elements and a central plug in each element with the said elements and plugs in each intermediate sheet similar to and similarly positioned to those in the other intermediate sheets, cutting through separately a plurality of similar end sheets of material to form in each in place therein a plurality of elements with the said elements in each end sheet similar to and similarly positioned to those in the intermediate sheets, removing the plugs from a plurality of intermediate sheets and superposing the said sheets upon an end sheet with the elements in registry and with adhesive interposed between the sheets, pressing the superposed sheets to secure an adhesive union thereof, filling the open cavities of the superposed sheets with pyrotechnic material, and superposing an end sheet on the uppermost intermediate sheet with the elements in registry and with interposed adhesive.

14. The method of making pyrotechnic articles which comprises cutting through separately a plurality of similar intermediate sheets of material to form in each in place therein a plurality of elements and a central plug in each element with the said elements and plugs in each intermediate sheet similar to and similarly positioned to those in the other intermediate sheets, cutting through separately a plurality of similar end sheets of material to form in each in place therein a plurality of elements with the said elements in each end sheet similar to and similarly positioned to those in the intermediate sheets, removing the plugs from a plurality of intermediate sheets and superposing the said sheets upon an end sheet with the elements in registry and with adhesive interposed between the sheets, pressing the superposed sheets to secure an adhesive union thereof, filling the open cavities of the superposed sheets with pyrotechnic material, superposing an end sheet on the uppermost intermediate sheet with the elements in registry and with interposed adhesive, and before final completion inserting a fuse in each element to extend from its cavity through and to project from the exterior of the element.

15. The method of making pyrotechnic articles as defined in claim 14, which comprises further detaching the several articles from the superposed sheets to present a plurality of detached pyrotechnic articles each with a projecting fuse.

16. The method of making pyrotechnic articles which comprises cutting through separately a plurality of cardboard sheets of which part are to constitute end sheets, part intermediate sheets and part intermediate fuse sheets to form in all of said sheets in place therein similarly positioned similar groups of elements; cutting through separately all of the said intermediate sheets to form therein similarly positioned similar central openings in the elements thereof; cutting through separately the said intermediate fuse sheets to form therein fuse slots extending from the central openings to the peripheries of the elements; removing the sheet material from the central openings and fuse slots; assembling a plurality of said cut sheets in superposed relation with the elements in registry and with adhesive between adjacent sheets with one or more end sheets at the bottom and at the top and with a plurality of intermediate sheets including one or more intermediate fuse sheets between the top and bottom sheets; laying fuses in the fuse slots and filling the cavity formed by the registering openings of the intermediate sheets with pyrotechnic material before the superpositioning of the top end sheets.

17. The method of making pyrotechnic articles which comprises the steps defined in claim 16, in which the cutting of the central openings through the intermediate sheets is performed simultaneously with the cutting therethrough to form the elements.

18. The method of making pyrotechnic articles which comprises the steps defined in claim 15, in which the cutting of the fuse slots through the intermediate fuse sheets is performed simultaneously with the cutting therethrough to form the central openings.

19. The method of forming a pyrotechnic article which comprises superposing in registry and adhesively securing together a plurality of discrete end and intermediate cardboard laminae of similar configuration at the exterior edge with the intermediate laminae having registering central openings forming a cavity closed by the end laminae and filling the cavity with pyrotechnic material before applying the topmost end laminae.

20. The method of forming a pyrotechnic article which comprises superposing in registry and adhesively securing together a plurality of discrete end and intermediate cardboard laminae of similar configuration at the exterior edge with the intermediate laminae having registering central openings forming a cavity closed by the end laminae and with one or more of said intermediate laminae having a fuse slot extending laterally from the central opening, filling the cavity with pyrotechnic material and laying a fuse in the fuse slot before applying the topmost end laminae.

21. A lamina for use in the manufacture of laminated pyrotechnic articles consisting of a sheet of cardboard having cut therethrough to form in place therein and longitudinally thereof laterally disposed pairs of elements of the configuration of the articles, each of the elements having a central opening with a slot extending therefrom to the edge of the element toward the adjacent edge of the sheet.

22. A lamina for use in the manufacture of laminated pyrotechnic articles consisting of a sheet of cardboard having cut therethrough to form in place therein and longitudinally thereof laterally disposed pairs of elements of the configuration of the articles, each of the element having a central opening with a slot extending therefrom to the edge of the element toward the adjacent edge of the sheet and with the slots at each side of the sheet in parallelism.

23. A lamina for use in the manufacture of laminated pyrotechnic articles consisting of a sheet of cardboard having cut therethrough to form in place therein and longitudinally thereof laterally disposed pairs of elements of the configuration of the articles, each of the elements having a central opening with a slot extending therefrom to the edge of the element toward the adjacent edge of the sheet and with the slots at each side of the sheet in parallelism and equispaced longitudinally of the sheet.

24. A pyrotechnic article comprising a plurality of at least three discrete end and intermediate laminae of sheet material adhesively secured together in which at least one intermediate lamina is provided with a central opening forming with the end laminae a closed cavity, pyrotechnic material in said cavity, and a fuse extending from said pyrotechnic material through a wall of the cavity and projecting from the exterior of the article.

25. A pyrotechnic article comprising a plurality of at least three discrete end and intermediate laminae of sheet material adhesively secured together in which at least one intermediate lamina is provided with a central opening and a slot extending from the central opening to the exterior edge, the said central opening forming with the end laminae a closed cavity, pyrotechnic material in said cavity, and a fuse in said slot extending from said pyrotechnical material and projecting from the exterior periphery of the article.

26. A pyrotechnic article comprising a plurality of at least three discrete end and intermediate laminae of the same size and same configuration and having the configuration at the exterior edge of a figure of an animal with the periphery of the laminae in registry, in which at least one intermediate lamina is provided with a central opening and a slot extending from the opening to the exterior edge at approximately the location for the tail of the animal, in which the said central opening forms with the end laminae a closed cavity, pyrotechnic material in said cavity, and a fuse located in said slot and projecting from the exterior of the article in simulation of the animal's tail.

27. A firecracker consisting of at least three discrete end and intermediate cardboard laminae of similar configuration at the exterior edge adhesively secured together in registry, in which at least one intermediate lamina is provided with a central opening forming with the end laminae a closed cavity, explosive material within the cavity and a fuse extending from the cavity to and projecting from the exterior of the firecracker.

28. A firecracker consisting of a least three discrete end and intermediate cardboard laminae of similar configuration at the exterior edge adhesively secured together in registry, in which at least one intermediate lamina is provided with a central opening forming with the end laminae a closed cavity, explosive material within the cavity and a fuse extending laterally from the cavity to and projecting from the edge of the firecracker.

29. The method of making pyrotechnic articles which comprises cutting through one or more intermediate sheets of material to form in place therein a plurality of elements and a central plug in each element with the said elements and plugs in each intermediate sheet similar to and similarly positioned to those in the other intermediate sheets, cutting through separately a plurality of similar end sheets of material to form in each in place therein a plurality of elements with the said elements in each end sheet similar to and similarly positioned to those in the intermediate sheets, removing the plugs from the intermediate sheet or sheets and superposing the said sheet or sheets upon an end sheet with the elements in registry and with adhesive interposed between the sheets, pressing the superposed sheets to form an adhesive union thereof, filling the open cavities of the superposed sheets with pyrotechnic material, and superposing an end sheet on the superposed sheets with the elements in registry and with an interposed adhesive.

30. The method of making pyrotechnic articles which comprises cutting through one or more intermediate sheets of material to form in place therein a plurality of elements and a central plug in each element with the said elements and plugs in each intermediate sheet similar to and similarly positioned to those in the other intermediate sheets, cutting through separately a plurality of similar end sheets of material to form in each in place therein a plurality of elements with the said elements in each end sheet similar to and similarly positioned to those in the intermediate sheets, removing the plugs from the intermediate sheet or sheets and superposing the said sheet or sheets upon an end sheet with the elements in registry and with adhesive interposed between the sheets, pressing the superposed sheets to form an adhesive union thereof, filling the open cavities of the superposed sheets with pyrotechnic material, superposing an end sheet on the superposed sheets with the elements in registry and with an interposed adhesive, and before final completion inserting a fuse in each element to extend from its cavity through and to project from the exterior of the element.

31. The method of forming a pyrotechnic article which comprises superposing in registry and adhesively securing together three discrete end and intermediate cardboard laminae of similar configuration at the exterior edge with the intermediate lamina having a central opening forming a cavity closed by the end laminae and filling the cavity with pyrotechnic material before applying the topmost end lamina.

32. The method of forming a pyrotechnic article which comprises superposing in registry and adhesively securing together three discrete end and intermediate cardboard laminae of similar configuration at the exterior edge with the intermediate lamina having a central opening forming a cavity closed by the end laminae and having a fuse slot extending laterally from the central opening, filling the cavity with pyrotechnic material and laying a fuse in the fuse slot before applying the topmost end lamina.

EDWIN V. BABBITT.
LEWIS D. COBURN.